(12) United States Patent
Cao et al.

(10) Patent No.: US 9,379,184 B1
(45) Date of Patent: Jun. 28, 2016

(54) SECURE CHIP WITH PHYSICALLY UNCLONABLE FUNCTION

(71) Applicant: INTERNATIONAL BUSINESS MACHINES CORPORATION, Armonk, NY (US)

(72) Inventors: Qing Cao, Yorktown Heights, NY (US); Kangguo Cheng, Schenectady, NY (US); Fei Liu, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/625,062

(22) Filed: Feb. 18, 2015

(51) Int. Cl.
| | |
|---|---|
| *H01L 29/06* | (2006.01) |
| *H01L 29/78* | (2006.01) |
| *H01L 29/86* | (2006.01) |
| *H01L 21/311* | (2006.01) |
| *H01L 21/3205* | (2006.01) |
| *H01L 29/861* | (2006.01) |

(52) U.S. Cl.
CPC ...... *H01L 29/0692* (2013.01); *H01L 21/31111* (2013.01); *H01L 21/32055* (2013.01); *H01L 29/0649* (2013.01); *H01L 29/78* (2013.01); *H01L 29/861* (2013.01)

(58) Field of Classification Search
CPC . H01L 29/0692; H01L 29/0649; H01L 29/78; H01L 29/861
See application file for complete search history.

(56) References Cited

U.S. PATENT DOCUMENTS

| | | | | |
|---|---|---|---|---|
| 7,459,365 | B2* | 12/2008 | Rub | H01L 29/0653 257/E21.648 |
| 8,394,729 | B2 | 3/2013 | Malik | |
| 8,513,730 | B2* | 8/2013 | Mauder | H01L 29/0653 257/328 |
| 8,519,436 | B2* | 8/2013 | Lochtefeld | H01L 21/02381 257/190 |
| 8,975,635 | B2* | 3/2015 | Chen | H01L 21/02381 257/190 |
| 2008/0099785 | A1 | 5/2008 | Bai et al. | |
| 2008/0268587 | A1* | 10/2008 | Sadaka | H01L 21/823807 438/199 |
| 2011/0049568 | A1 | 3/2011 | Lochtefeld et al. | |
| 2013/0081684 | A1* | 4/2013 | Fiorenza | H01L 31/078 136/255 |
| 2013/0105859 | A1* | 5/2013 | Wang | H01L 29/78 257/190 |
| 2013/0207161 | A1* | 8/2013 | Wang | H01L 21/02381 257/190 |
| 2014/0374798 | A1* | 12/2014 | Lochtefeld | H01L 21/02381 257/190 |
| 2015/0170930 | A1* | 6/2015 | Hydrick | H01L 21/02057 438/478 |
| 2015/0206796 | A1* | 7/2015 | Dasgupta | H01L 21/02381 257/76 |
| 2015/0249087 | A1* | 9/2015 | Cantoro | H01L 27/0924 257/369 |
| 2016/0064492 | A1* | 3/2016 | Li | H01L 21/02381 257/190 |

\* cited by examiner

*Primary Examiner* — Ida M Soward
(74) *Attorney, Agent, or Firm* — Scully, Scott, Murphy & Presser, P.C.; Steven J. Meyers (57) ABSTRACT

A first trench having a first aspect ratio and a second trench having a second aspect ratio that is greater than the first trench are provided into a material stack of a semiconductor substrate and a dielectric material. An epitaxial semiconductor material having a different lattice constant than the substrate is then grown within each of the first and second trenches. The semiconductor material which is epitaxially formed in the first trench has an upper semiconductor material portion that is entirely defect free, while the semiconductor material which is epitaxially formed in the second trench has defects that randomly propagate to the topmost surface of the semiconductor material. At least one semiconductor device is then formed on each epitaxially grown semiconductor material. The at least one semiconductor device located on the epitaxially grown semiconductor material formed in the second trench is a physical unclonable function device.

10 Claims, 3 Drawing Sheets

SECURE CHIP WITH PHYSICALLY UNCLONABLE FUNCTION

BACKGROUND

The present application relates to a semiconductor structure and a method of forming the same. More particularly, the present application provides a method and structure for forming semiconductor chips with a physically unclonable function (PUF).

Semiconductor chip authentication is becoming more and more critical for cloud and mobile applications. The ideal semiconductor chip authentication should be hard to attack, randomly generated, and low cost. One means for semiconductor chip authentication is to implement a physical unclonable function (PUF) within the semiconductor chip.

A PUF is a physical entity that is embodied in a physical structure and is easy to evaluate, but hard to predict. Further, an individual PUF device must be easy to make, but practically impossible to duplicate, even given the exact manufacturing process that produced it.

Conventional approaches for implementing PUFs within a semiconductor chip require additional processing steps and thus increase process cost and complexity. Therefore, there is a need for a cost-effective way to fabricate a semiconductor chip with PUFs.

SUMMARY

A first trench having a first aspect ratio and a second trench having a second aspect ratio that is greater than the first trench are provided into a material stack of, from bottom to top, a semiconductor substrate and a dielectric material. An epitaxial semiconductor material having a different lattice constant than the substrate is then grown within each of the first and second trenches. The semiconductor material which is epitaxially formed in the first trench has an upper semiconductor material portion that is entirely defect free, while the semiconductor material which is epitaxially formed in the second trench has defects that randomly propagate to the topmost surface of the semiconductor material. At least one semiconductor device is then formed on each epitaxially grown semiconductor material. The at least one semiconductor device located on the epitaxially grown semiconductor material formed in the second trench is a physical unclonable function device.

In one aspect of the present application, a semiconductor structure containing physical unclonable function devices is provided. In one embodiment of the present application, the semiconductor structure includes a material stack of, from bottom to top, a semiconductor substrate and a dielectric material, wherein a first trench having a first aspect ratio and a second trench having a second aspect ratio that is greater than the first aspect ratio are present extending entirely through the dielectric material and partially through the semiconductor substrate. An epitaxial semiconductor material having a different lattice constant than an upper semiconductor material portion of the semiconductor substrate is present in the first trench and the second trench, wherein the epitaxial semiconductor material present in the first trench has a lower semiconductor material portion that contains defects and an upper semiconductor material portion that is defect free, and the epitaxial semiconductor material present in the second trench contains defects that randomly propagate to a topmost surface of the epitaxial semiconductor material. At least one semiconductor device is located on the epitaxial semiconductor material formed in the first and second trenches, wherein the at least one semiconductor device located on the epitaxial semiconductor material in the second trench is a physical unclonable function device.

In another aspect of the present application, a method of forming a semiconductor structure containing physical unclonable function devices is provided. In one embodiment of the present application, the method includes providing a material stack of, from bottom to top, a semiconductor substrate and a dielectric material. Next, a first trench having a first aspect ratio is formed in a first region of the material stack and a second trench having a second aspect ratio that is greater than the first aspect ratio is formed in a second region of the material stack. The first and second trenches expose an upper semiconductor material portion of the semiconductor substrate. A semiconductor material having a different lattice constant than the upper semiconductor material portion of the semiconductor substrate is epitaxially grown in the first trench and in the second trench. In accordance with the present application, the semiconductor material formed in the first trench has a lower semiconductor material portion that contains defects and an upper semiconductor material portion that is defect free, and the semiconductor material formed in the second trench contains defects that randomly propagate to a topmost surface of the semiconductor material. Next, at least one semiconductor device is formed on the epitaxial semiconductor material that is present in the first and second trenches, wherein the at least one semiconductor device formed on the epitaxial semiconductor material in the second trench is a physical unclonable function device.

DESCRIPTION

The present application will now be described in greater detail by referring to the following discussion and drawings that accompany the present application. It is noted that the drawings of the present application are provided for illustrative purposes only and, as such, the drawings are not drawn to scale. It is also noted that like and corresponding elements are referred to by like reference numerals.

In the following description, numerous specific details are set forth, such as particular structures, components, materials, dimensions, processing steps and techniques, in order to provide an understanding of the various embodiments of the present application. However, it will be appreciated by one of ordinary skill in the art that the various embodiments of the present application may be practiced without these specific details. In other instances, well-known structures or processing steps have not been described in detail in order to avoid obscuring the present application.

Figure 1:
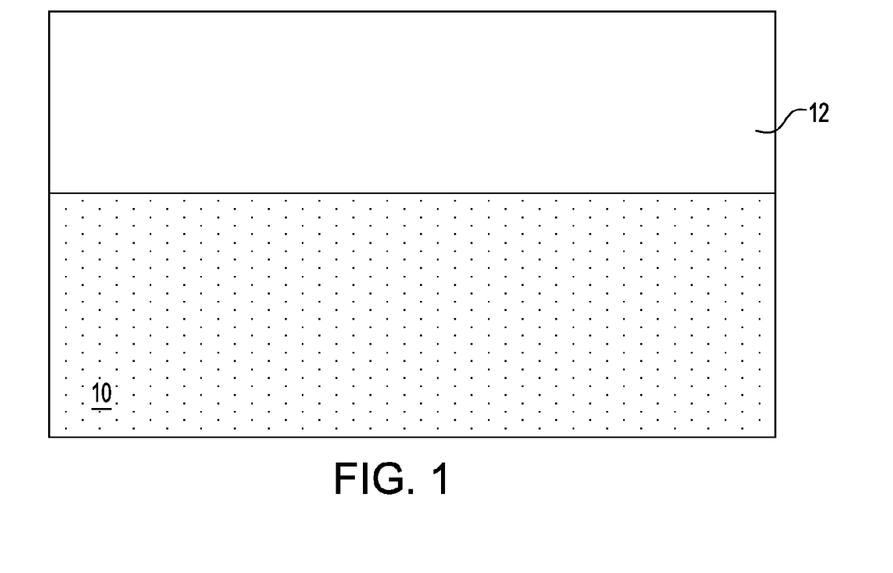
FIG. 1 is a cross sectional view of an exemplary semiconductor structure including a dielectric material located on a topmost surface of a semiconductor substrate in accordance with an embodiment of the present application.

Referring first to FIG. 1, there is illustrated an exemplary semiconductor structure, i.e., a material stack, including a dielectric material 12 located on a topmost surface of a semiconductor substrate 10 in accordance with an embodiment of the present application.

In some embodiments of the present application, the semiconductor substrate 10 can be a bulk semiconductor substrate. When a bulk semiconductor substrate is employed as semiconductor substrate 10, the bulk semiconductor substrate can be comprised of any semiconductor material including, but not limited to, Si, Ge, SiGe, SiC, SiGeC, and III/V compound semiconductors such as, for example, InAs, GaAs, and InP. Multilayers of these semiconductor materials can also be used as the semiconductor material of the bulk semiconductor. In one embodiment, the semiconductor substrate 10 can be comprised of a single crystalline semiconductor material, such as, for example, single crystalline silicon. In other embodiments, the semiconductor substrate 10 may comprise a polycrystalline or amorphous semiconductor material.

In another embodiment, a semiconductor-on-insulator (SOI) substrate (not specifically shown) can be employed as the semiconductor substrate 10. Although not specifically shown, one skilled in the art understands that an SOI substrate includes a handle substrate, a buried insulator layer located on an upper surface of the handle substrate, and a semiconductor layer located on an upper surface of the buried insulator layer. The handle substrate provides mechanical support for the buried insulator layer and the semiconductor layer.

The handle substrate and the semiconductor layer of the SOI substrate may comprise the same, or different, semiconductor material. The term "semiconductor" as used herein in connection with the semiconductor material of the handle substrate and the semiconductor layer denotes any semiconductor material including, for example, Si, Ge, SiGe, SiC, SiGeC, and III/V compound semiconductors such as, for example, InAs, GaAs, or InP. Multilayers of these semiconductor materials can also be used as the semiconductor material of the handle substrate and the semiconductor layer. In one embodiment, the handle substrate and the semiconductor layer are both comprised of silicon. In some embodiments, the handle substrate is a non-semiconductor material including, for example, a dielectric material and/or a conductive material. In yet other embodiments, the handle substrate can be omitted and a substrate including an insulator layer and a semiconductor layer can be used as semiconductor substrate 10.

In some embodiments, the handle substrate and the semiconductor layer may have the same or different crystal orientation. For example, the crystal orientation of the handle substrate and/or the semiconductor layer may be {100}, {110}, or {111}. Other crystallographic orientations besides those specifically mentioned can also be used in the present application. The handle substrate and/or the semiconductor layer of the SOI substrate may be a single crystalline semiconductor material, a polycrystalline material, or an amorphous material. Typically, at least the semiconductor layer is a single crystalline semiconductor material. In some embodiments, the semiconductor layer that is located atop the buried insulator layer can be processed to include semiconductor regions having different crystal orientations.

The buried insulator layer of the SOI substrate may be a crystalline or non-crystalline oxide or nitride. In one embodiment, the buried insulator layer is an oxide such as, for example, silicon dioxide. The buried insulator layer may be continuous or it may be discontinuous. When a discontinuous buried insulator region is present, the insulator region exists as an isolated island that is surrounded by semiconductor material.

The SOI substrate may be formed utilizing standard processes including for example, SIMOX (separation by ion implantation of oxygen) or layer transfer. When a layer transfer process is employed, an optional thinning step may follow the bonding of two semiconductor wafers together. The optional thinning step reduces the thickness of the semiconductor layer to a layer having a thickness that is more desirable.

In one example, the thickness of the semiconductor layer of the SOI substrate can be from 10 nm to 100 nm. In another example, the thickness of the semiconductor layer of the SOI substrate can be from 50 nm to 70 nm. In some embodiments, and when an ETSOI (extremely thin semiconductor-on-insulator) substrate is employed, the semiconductor layer of the SOI has a thickness of less than 10 nm. If the thickness of the semiconductor layer is not within one of the above mentioned ranges, a thinning step such as, for example, planarization or etching can be used to reduce the thickness of the semiconductor layer to a value within one of the ranges mentioned above. The buried insulator layer of the SOI substrate typically has a thickness from 1 nm to 200 nm, with a thickness from 100 nm to 150 nm being more typical. The thickness of the handle substrate of the SOI substrate is inconsequential to the present application.

Semiconductor substrate 10 may be doped, undoped or contain doped and undoped regions therein. For clarity, the doped regions are not specifically shown in the drawings of the present application. Each doped region within the semiconductor material of the semiconductor substrate 10 may have the same, or they may have different conductivities and/or doping concentrations. The doped regions that are present in the semiconductor material of semiconductor substrate 10 are typically referred to as well regions and they are formed utilizing a conventional ion implantation process, or gas phase doping.

As is shown in FIG. 1, dielectric material 12 is present on a topmost surface of the semiconductor substrate 10. The dielectric material 12 is a contiguous layer that covers the entirety of the topmost surface of the semiconductor substrate 10. The dielectric material 12 may include a semiconductor oxide, a semiconductor nitride and/or a semiconductor oxynitride. In one embodiment, the dielectric material 12 may be composed of silicon dioxide. In another embodiment, the dielectric material 12 may be composed of silicon nitride. In yet another embodiment, the dielectric material 12 may be a stack comprised of, in any order, silicon dioxide and silicon nitride.

In some embodiments, the dielectric material 12 can be formed by a deposition process such as, for example, chemical vapor deposition (CVD) or plasma enhanced chemical vapor deposition (PECVD). In other embodiments, the dielectric material 12 can be formed by a thermal process such as, for example, thermal oxidation and/or thermal nitridation. In yet other embodiments, dielectric material 12 can be formed by a combination of a deposition process and a thermal process. In one embodiment of the present application, the thickness of the dielectric material 12 can range from 50 nm to 500 nm. In another embodiment of the present application, the dielectric material 12 may have a thickness from 100 nm to 250 nm. Other thicknesses that are lesser than or greater than the aforementioned thicknesses ranges may also be employed for the thickness of the dielectric material 12.

Figure 2:
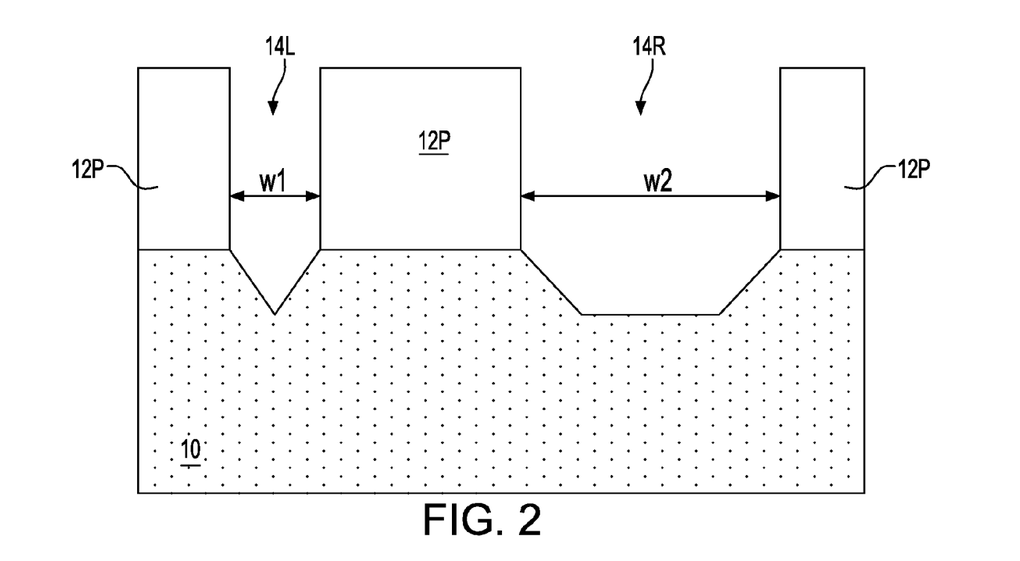
FIG. 2 is a cross sectional view of the exemplary semiconductor structure of FIG. 1 after forming a first trench having a first width and a second trench having a second width that is greater than the first width in different regions of the dielectric material and the semiconductor substrate.

Referring now to FIG. 2, there is illustrated the exemplary semiconductor structure of FIG. 1 after forming a first trench 14L having a first width, w1, and a second trench 14R having a second width, w2, that is greater than the first width, w1, in different regions of the dielectric material 12 and the semiconductor substrate 10. The dielectric material 12 that remains after first trench 14L and second trench 14R formation can be referred to herein as a dielectric material portion 12P. As shown, the first and second trenches 14L, 14R expose an upper semiconductor material portion of the semiconductor substrate 10.

In one embodiment of the present application, the first width, w1, of the first trench 14L is from 5 nm to 100 nm, while the second width, w2, of the second trench 14R is from 120 nm to 2000 nm. In another embodiment of the present application, the first width, w1, of the first trench 14L is from 10 nm to 50 nm, while the second width, w2, of the second trench 14R is from 200 nm to 500 nm. In accordance with the present application, the first trench 14L has a same depth as the second trench 14R.

In accordance the present application, the first trench 14L has a first aspect ratio (i.e., first width to height) that is less than a second aspect ratio (i.e., second width to height) of the second trench 14R. In one embodiment of the present application, the first trench 14L has a first aspect ratio from 1:50 to 1:1.2, while the second trench 14R has a second aspect ratio from 10:1 to 1:1. In another embodiment of the present application, the first trench 14L has a first aspect ratio from 1:10 to 1:5, while the second trench 14R has a second aspect ratio from 5:1 to 2:1.

The first trench 14L and second trenches 14R can be formed by any suitable patterning technique such as utilizing successive lithography and etching steps. In some embodiments, a block mask can provided over one area of the structure, while the other area is subjected to lithography and etching. In one embodiment, the first trench 14L is formed first, and then the second trench 14R is formed. In another embodiment, the second 14R is formed first, and then the first trench 14L is formed. Lithography includes forming a photoresist (not shown) atop the dielectric material 12, exposing the photoresist to a desired pattern (i.e., trench pattern) of irradiation, and developing the photoresist material utilizing a conventional resist developer. Etching may include dry etching and/or wet etching. Dry etching includes reactive ion etching, plasma etching, ion bean etching or laser ablation. Wet etching includes a chemical etchant that is selective in removing exposed portions of the dielectric material 12 and/or semiconductor substrate 10. In some embodiments, a single etch may be used to transfer the pattern from the patterned photoresist into the material stack of dielectric material 12 and semiconductor substrate 10. In other embodiments, a first etch is utilizing to transfer the pattern from the patterned photoresist into the dielectric material 12, and a second etch can be used to transfer the pattern from the dielectric material 12 into the underlying semiconductor substrate 10. The patterned photoresist can be removed from the structure anytime after pattern transfer utilizing a conventional photoresist removal process such as, for example, ashing.

Other patterning processes can be used in forming the first trench 14L and second trench 14R. For example, a sidewall image transfer (SIT) process may be used in forming the first and second trenches 14L, 14R. The SIT process includes forming a contiguous mandrel material layer (not shown) on the topmost surface of the dielectric material 12. The contiguous mandrel material layer (not shown) can include any material (semiconductor, dielectric or conductive) that can be selectively removed from the structure during a subsequently performed etching process. In one embodiment, the contiguous mandrel material layer (not shown) may be composed of amorphous silicon or polysilicon. In another embodiment, the contiguous mandrel material layer (not shown) may be composed of a metal such as, for example, Al, W, or Cu. The contiguous mandrel material layer (not shown) can be formed, for example, by chemical vapor deposition or plasma enhanced chemical vapor deposition. The thickness of the contiguous mandrel material layer (not shown) can be from 50 nm to 300 nm, although lesser and greater thicknesses can also be employed. Following deposition of the contiguous mandrel material layer (not shown), the contiguous mandrel material layer (not shown) can be patterned by lithography and etching to form a plurality of mandrel structures (also not shown) on the surface of the dielectric material 12.

The SIT process continues by forming a dielectric spacer on each sidewall of each mandrel structure. The dielectric spacer can be formed by deposition of a dielectric spacer material and then etching the deposited dielectric spacer material. The dielectric spacer material may comprise any dielectric spacer material such as, for example, silicon dioxide, silicon nitride or a dielectric metal oxide. Examples of deposition processes that can be used in providing the dielectric spacer material include, for example, chemical vapor deposition (CVD), plasma enhanced chemical vapor deposition (PECVD), or atomic layer deposition (ALD). Examples of etching that be used in providing the dielectric spacers include any etching process such as, for example, reactive ion etching.

After formation of the dielectric spacers, the SIT process continues by removing each mandrel structure. Each mandrel structure can be removed by an etching process that is selective for removing the mandrel material as compared to the material of the dielectric spacers and dielectric material 12. Following the mandrel structure removal, the SIT process continues by transferring the pattern provided by the dielectric spacers into the dielectric material 14 and then into the semiconductor substrate 10. The pattern transfer may be achieved by an etching process. Examples of etching processes that can used to transfer the pattern may include dry etching (i.e., reactive ion etching, plasma etching, ion beam etching or laser ablation) and/or a chemical wet etch process. In one example, the etch process used to transfer the pattern may include one or more reactive ion etching steps. Upon completion of the pattern transfer, the SIT process concludes by removing the dielectric spacers from the structure. Each dielectric spacer may be removed by etching or a planarization process. In some cases, the first trench 14L can be formed by SIT process and the second trench 14R can be formed by lithography and etching.

In some embodiments of the present application (not shown), the first trench 14L and the second trench 14R have vertical sidewalls that extend entirely through the dielectric material 12 and an upper portion of the semiconductor substrate 10 stopping at a horizontal sub-surface of the semiconductor substrate 10. By "sub-surface" it is meant a surface of the material that is located between the topmost surface and the bottommost surface of a material. In some embodiments (and as shown), the first trench 14L and the second trench 14R have vertical sidewalls that extend entirely through the dielectric material 12 and then the sidewalls of the trenches within the semiconductor substrate 10 begin to taper inward towards each other. In yet other embodiments, (not shown), the first trench 14L or the second trench 14R has vertical sidewalls that extend entirely through the dielectric material 12 and an upper portion of the semiconductor substrate 10 stopping at a horizontal sub-surface of the semiconductor substrate 10, while the other of the first trench 14L or the second trench 14R has vertical sidewalls that extend entirely through the dielectric material 12 and then the sidewalls of the trenches within the semiconductor substrate 10 begin to taper inward toward each other.

Figure 3:
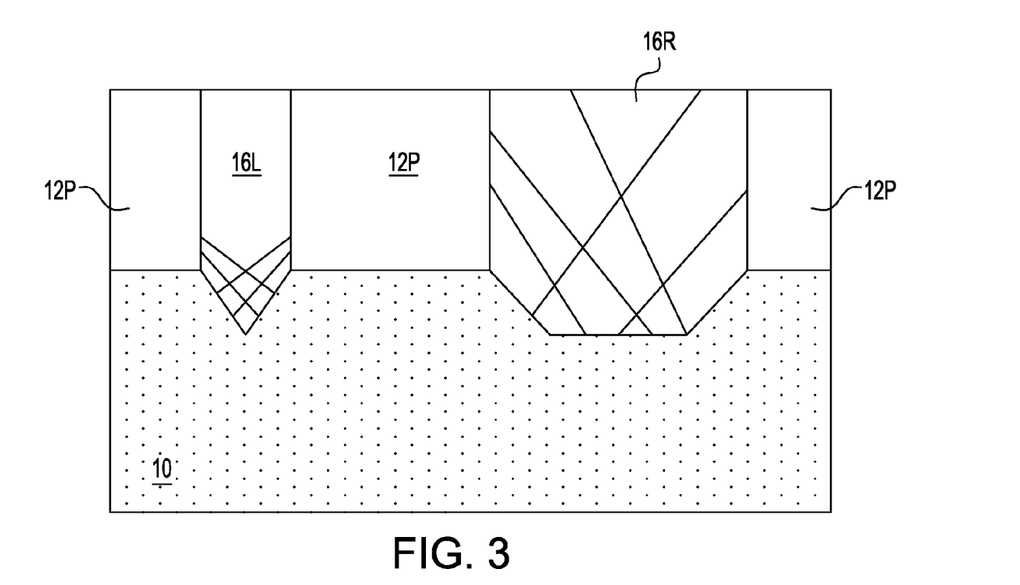
FIG. 3 is a cross sectional view of the exemplary semiconductor structure of FIG. 2 after forming an epitaxial semiconductor material having a different lattice constant than at least an upper semiconductor material portion of the semiconductor substrate.

Referring now to FIG. 3, there is illustrated the exemplary semiconductor structure of FIG. 2 after forming an epitaxial semiconductor material 16L, 16R having a different lattice constant than at least an uppermost semiconductor material portion of the semiconductor substrate 10. In the illustrated embodiment, the epitaxial semiconductor material 16L completely fills the volume of the first trench 14L, while the epitaxial semiconductor material 16R completely fills the volume of the second trench 14R. As is also shown, the epitaxial semiconductor material 16L contacts exposed surfaces of the dielectric material portion 12P and an upper semiconductor material portion of the semiconductor substrate 10 within the first trench 14L, while the epitaxial semiconductor material 16R contacts exposed surfaces of the dielectric material portion 12P and the upper semiconductor material portion of the semiconductor substrate 10 within the second trench 14R.

The epitaxial semiconductor material 16L, 16R that is formed comprises a different semiconductor material than the semiconductor material within an upper portion of the semiconductor substrate 10. In one example, and when an upper portion of the semiconductor substrate 10 is composed of Si, the epitaxial semiconductor material 16L, 16R may be composed of germanium, an III-V compound semiconductor or an II-VI compound semiconductor. In some embodiments, the epitaxial semiconductor material 16L and the epitaxial semiconductor material 16R comprise a same semiconductor material. In another embodiment, the epitaxial semiconductor material 16L comprises a different semiconductor material than the epitaxial semiconductor material 16R. When different semiconductor materials are used in providing the epitaxial semiconductor materials 16L, 16R, block mask technology may be used in conjunction with separate epitaxial deposition processes.

Epitaxial semiconductor material 16L that is formed in the first trench 14L includes a lower portion (illustrated by the intersecting lines "χ" in a lower portion of 16L) containing defects and an upper portion (not including any intersecting lines "χ" in an upper portion of 16L) containing no defects (i.e., defect free). By 'defect free' it is meant that the epitaxial semiconductor material 16L does not contain defects that propagate to the topmost surface; instead, the defects get trapped within a lower portion of the first trench 14L. Epitaxial semiconductor material 16R that is formed in the second trench 14R contains defects (illustrated by the intersect lines "χ" in 16R) that randomly propagate throughout the entire height of the second trench 14R and randomly reach the topmost surface of the epitaxial semiconductor material 16R. Due to the randomness of the defects that propagate to the topmost surface of the epitaxial semiconductor material 16R in the second trench 14R, the epitaxial semiconductor material 16R provides a base substrate in which PUF devices can be subsequently formed.

Each epitaxial semiconductor material 16L, 16R that is provided can be formed utilizing an epitaxial semiconductor regrowth process (or aspect ratio trapping process) such as is described, for example, in U.S. Patent Application Publication No. 2011/0049568 to Lochtefeld et al., the entire content and disclosure of which is incorporated herein by reference. Notably, and since an epitaxial semiconductor regrowth process is used, each epitaxial semiconductor material 16L, 16R has a same crystalline characteristic as the semiconductor material of the deposition surface. Thus, in the present application, each epitaxial semiconductor material 16L, 16R has epitaxial relationship, i.e., same crystal orientation, with the upper semiconductor material portion of semiconductor substrate 10.

Each epitaxial semiconductor material 16L, 16R can be formed by selective epitaxial growth in any suitable epitaxial deposition system, including, but not limited to, atmospheric-pressure CVD (APCVD), low- (or reduced-) pressure CVD (LPCVD), ultra-high-vacuum CVD (UHVCVD), by molecular beam epitaxy (MBE), metal-organic CVD (MOCVD) or by atomic layer deposition (ALD). In the CVD process, selective epitaxial growth typically includes introducing a source gas into the chamber. The source gas may include at least one precursor gas and a carrier gas, such as, for example hydrogen. The reactor chamber is heated, such as, for example, by RF-heating. The growth temperature in the chamber may range from 250° C. to 900° C. The growth system also may utilize low-energy plasma to enhance the layer growth kinetics. The epitaxial growth system may be a single-wafer or multiple-wafer batch reactor.

In some embodiments, epitaxial semiconductor material 16L can be formed within the first trench 14L at a same time as epitaxial semiconductor material 16R is formed in the second trench 14R. In other embodiments, epitaxial semiconductor material 16L can be formed within the first trench 14L prior to, or after, epitaxial semiconductor material 16R is formed in the second trench 14R.

In some embodiments of the present application and following the epitaxial semiconductor regrowth process, an etch back process or a planarization process such as, for example, chemical mechanical planarization can be performed to provide epitaxial semiconductor material 16L, 16R having a topmost surface that is coplanar with a topmost surface of each dielectric material portion 12P. In yet other embodiments of the present application, a topmost surface of each of the epitaxial semiconductor material 16L, 16R can be located above or below a topmost surface of each dielectric portion 12P.

Figure 4:
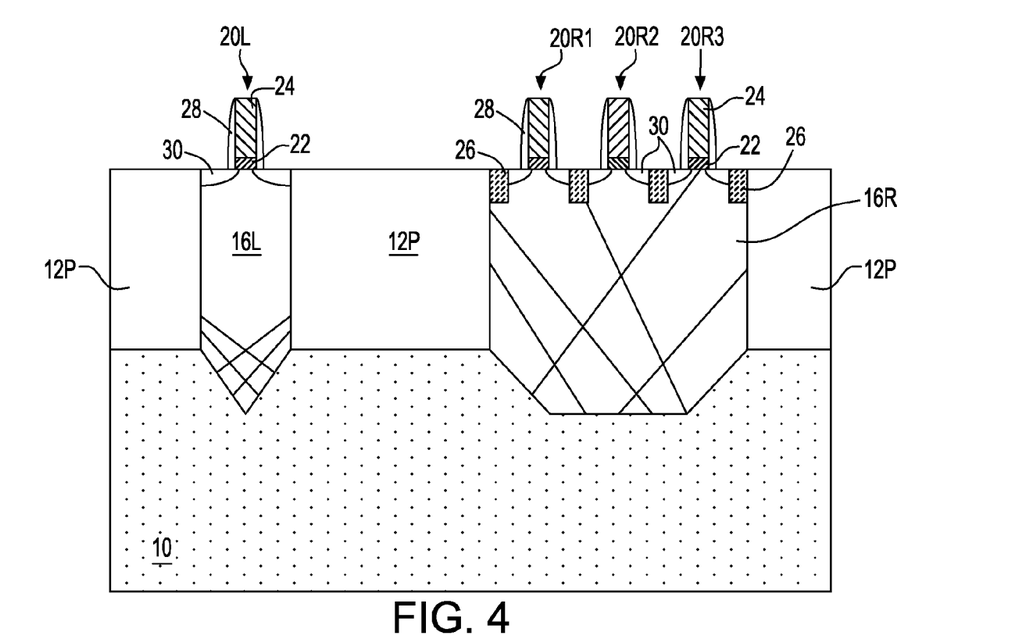
FIG. 4 is a cross sectional view of the exemplary semiconductor structure of FIG. 3 after forming field effect transistors (FETs) on the epitaxial semiconductor material formed in the first and second trenches.

Referring now to FIG. 4, there is illustrated the exemplary semiconductor structure of FIG. 3 after forming field effect transistors (FETs) 20L, 20R1, 20R2, 20R3 on the epitaxial semiconductor material 16L, 16R. As is shown, FET 20L is formed on epitaxial semiconductor material 16L in which the defects are trapped at a bottom portion of the first trench 14L. As such, the channel of FET 20L is free of epitaxial defects. FETS 20R1, 20R2 and 20R3 are formed on epitaxial semiconductor material 16R. In this case, it is possible to obtain FETs (i.e., FETs 20R1 and 20R2) that are free of defects and/or FETs (i.e., FET 20R3) that are leaky since defects randomly propagate through the channel region of such an FET. FET 20L1 represents a normal logic or SRAM transistor, while FETS 20R1, 20R2 and 20R3 are PUF devices. It is noted that the number of FETs formed on epitaxial semiconductor material 16L and epitaxial semiconductor material 16R are not limited to the number shown in FIG. 4. Instead, any number of FETs can be formed on epitaxial semiconductor material 16L, 16R as desired.

Each FET 20L, 20R1, 20R2 and 20R3 contains a gate dielectric material portion 22 and a gate conductor material portion 24. In this embodiment, gate dielectric material portion 22 and gate conductor material portion 24 provide a functional gate structure. The term "functional gate structure" is used throughout the present application as a permanent gate structure used to control output current (i.e., flow of carriers in the channel) of a semiconducting device through electrical or magnetic fields.

In some embodiments, a trench isolation region 26 can be processed into the epitaxial semiconductor material 16L, 16R prior to formation of the FET. In the illustrated embodiment, trench isolation regions 26 are processed into the epitaxial semiconductor material 16R prior to formation of FETs 20R1, 20R2 and 20R3. When present, the trench isolation regions 26 can be formed by first forming trenches within the epitaxial semiconductor material 16L, 16R by lithography and etching. The trenches are then filled with a trench dielectric material such as, for example, a silicon dioxide. Following filling of the trenches with a trench dielectric material, a planarization process can be performed.

In some embodiments, each gate dielectric material portion 22 may comprise a same gate dielectric material. In other embodiments, each gate dielectric material portion 22 may comprise a different gate dielectric material. In yet other embodiments, a first set of FETs contains gate dielectric portions 22 that comprise a same gate dielectric material, while a second set of FETs contains gate dielectric material portions 22 that comprise a different gate dielectric material than that which provides the gate dielectric material portions 22 of the first set of FETs.

In some embodiments, each gate conductor material portion 24 may comprise a same gate conductor material. In other embodiments, each gate conductor material portion 24 may comprise a different gate conductor material. In yet other embodiments, a first set of FET contain gate conductor material portions 24 that comprise a same gate conductor material, while a second set of FETs contain gate conductor material portions 24 that comprise a different gate conductor material than that which provides the gate conductor material portions 24 of the first set of FETs.

FETs 20L, 20R1, 20R2 and 20R3 can be formed utilizing a gate-first process, a gate-last process or a combination of a gate first process and a gate last process. In a gate first process, the gate structure is formed first followed by the source/drain regions.

In a gate last process, the gate structure is formed after source/drain regions are formed. In such a process, sacrificial gate structures (not shown) can be formed on an exposed portion of the epitaxial semiconductor material 16L, 16R. Next, source regions and drain regions are formed on opposite sides of each sacrificial gate structure and within the epitaxial semiconductor material 16L, 16R. Next, each sacrificial gate structure may be replaced with a functional gate structure as defined above.

The gate dielectric material that provides each gate dielectric material portion 22 can be an oxide, nitride, and/or oxynitride. In one example, the gate dielectric material that provides each gate dielectric material portion 22 can be a high-k material having a dielectric constant greater than silicon dioxide. Exemplary high-k dielectrics include, but are not limited to, $HfO_2$, $ZrO_2$, $La_2O_3$, $Al_2O_3$, $TiO_2$, $SrTiO_3$, $LaAlO_3$, $Y_2O_3$, $HfO_xN_y$, $ZrO_xN_y$, $La_2O_xN_y$, $Al_2O_xN_y$, $TiO_xN_y$, $SrTiO_xN_y$, $LaAlO_xN_y$, $Y_2O_xN_y$, SiON, $SiN_x$, a silicate thereof, and an alloy thereof. Each value of x is independently from 0.5 to 3 and each value of y is independently from 0 to 2. In some embodiments, a multilayered gate dielectric structure comprising different gate dielectric materials, e.g., silicon dioxide, and a high-k gate dielectric can be formed and used as a gate dielectric material portion 22.

The gate dielectric material used in providing each gate dielectric material portion 22 can be formed by any deposition technique including, for example, chemical vapor deposition (CVD), plasma enhanced chemical vapor deposition (PECVD), physical vapor deposition (PVD), sputtering, or atomic layer deposition. In some embodiments, a thermal process including, for example, thermal oxidation and/or thermal nitridation may be used in forming each gate dielectric material portion 22. When a different gate dielectric material is used for the gate dielectric material portions 22, block mask technology can be used. In one embodiment of the present application, the gate dielectric material used in providing each gate dielectric material portion 22 can have a thickness in a range from 1 nm to 10 nm. Other thicknesses that are lesser than or greater than the aforementioned thickness range can also be employed for the gate dielectric material. In some embodiments, and when a gate last process is employed, each gate dielectric material portion 22 may be U-shaped.

Each gate conductor material portion 24 comprises a gate conductor material. The gate conductor material used in providing each gate conductor material portion 24 can include any conductive material including, for example, doped polysilicon, an elemental metal (e.g., tungsten, titanium, tantalum, aluminum, nickel, ruthenium, palladium and platinum), an alloy of at least two elemental metals, an elemental metal nitride (e.g., tungsten nitride, aluminum nitride, and titanium nitride), an elemental metal silicide (e.g., tungsten silicide, nickel silicide, and titanium silicide) or multilayered combinations thereof.

The gate conductor material used in providing each gate conductor material portion 24 can be formed utilizing a deposition process including, for example, chemical vapor deposition (CVD), plasma enhanced chemical vapor deposition (PECVD), physical vapor deposition (PVD), sputtering, atomic layer deposition (ALD) or other like deposition processes. When a metal silicide is formed, a conventional silicidation process is employed. When a different gate conductor material is used for the gate conductor portions 24, block mask technology can be used. In one embodiment, the gate conductor material used in providing each gate conductor material portion 24 has a thickness from 1 nm to 100 nm. Other thicknesses that are lesser than or greater than the aforementioned thickness range can also be employed for the gate conductor material used in providing each gate conductor material portion 24.

Each gate conductor material and each gate dielectric material may be patterned after formation thereof forming gate structures (22 and 24). In some embodiments, and as shown, each gate dielectric material portion 22 has sidewalls that are vertical coincident with sidewalls of an overlying gate conductor material portion 24.

A dielectric spacer material (not shown) may then be formed on each gate structure (22 and 24) and thereafter the dielectric spacer material can be etched to form dielectric spacers 28 on exposed sidewall surfaces of each gate structure (22 and 24). The dielectric spacer material may include an oxide, a nitride and/or an oxynitride. In one example, the dielectric spacer material is silicon dioxide or silicon nitride. The dielectric spacer material can be formed utilizing a deposition process such as, for example, chemical vapor deposition (CVD), plasma enhanced chemical vapor deposition (PECVD) or physical vapor deposition (PVD). Etching of the dielectric spacer material may comprise a dry etch or a chemical wet etch. In a gate last process, the dielectric spacers 28 can be formed on vertical sidewalls of each sacrificial gate structure prior to formation of the functional gate structures.

A source region and a drain region (collectively referred to herein as source/drain regions 30) can be formed in the epitaxial semiconductor material 16L, 16R. The source/drain regions 30 can be formed by introducing a dopant into the epitaxial semiconductor material 16L, 16R that is not covered by the gate structure (22 and 24) and dielectric spacers 28. The dopant can be n-type or p-type. The term "p-type" refers to the addition of impurities to an intrinsic semiconductor that creates deficiencies of valence electrons. "N-type" refers to the addition of impurities that contributes free electrons to an intrinsic semiconductor. In some embodiments, the dopant may be introduced by ion implantation, plasma doping or gas phase doping. The concentration of dopants used in providing the source/drain regions 30 can range from 5E18 atoms/cm$^3$ to 1.5E21 atoms/cm$^3$.

Figure 5:
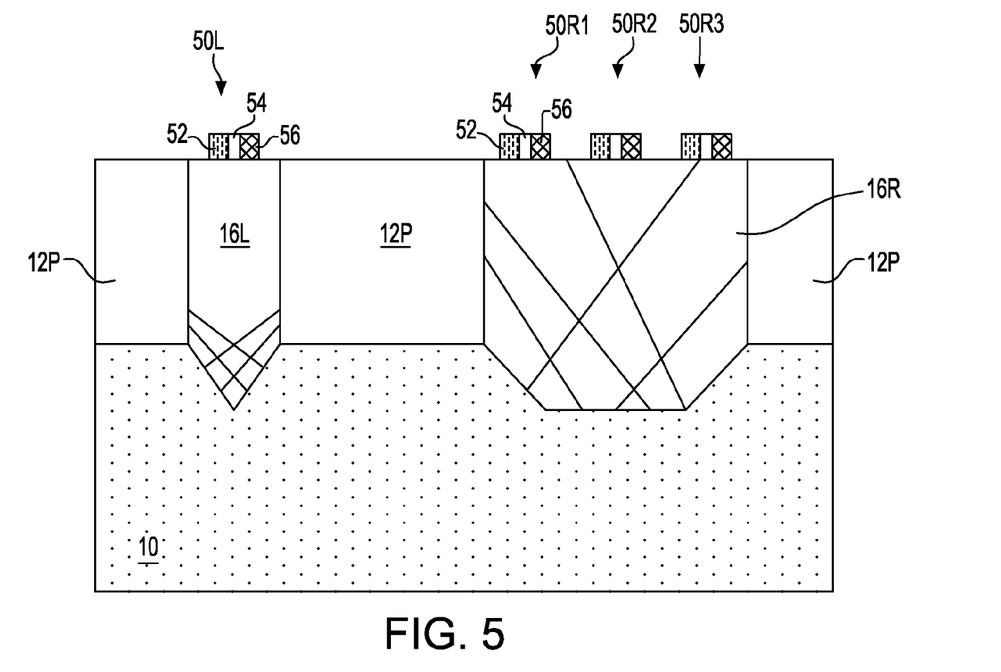
FIG. 5 is a cross sectional view of the exemplary semiconductor structure of FIG. 3 after forming semiconductor diodes on the epitaxial semiconductor material formed in the first and second trenches.

Referring now FIG. 5, there is illustrated the exemplary semiconductor structure of FIG. 3 after forming semiconductor diodes 50L, 50R1, 50R2, 50R3 on the epitaxial semiconductor material 16L, 16R.

As is shown, semiconductor diode 50L is formed on epitaxial semiconductor material 16L in which the defects are trapped at a bottom portion of the first trench 14L. As such, there are no defects at the interface between the epitaxial semiconductor material 16L and the bottommost semiconductor material diode portion of semiconductor diode 50L. Semiconductor diodes 50R1, 50R2 and 50R3 are formed on or in the epitaxial semiconductor material 16R. In this case, it is possible to obtain semiconductor diodes (i.e., diodes 50R1 and 50R2) that are free of defects and/or semiconductor diodes (i.e., diode 50R3) that are leaky since defects randomly propagate to the top surface of epitaxial semiconductor material 16R in this region of the structure. Semiconductor diodes 50R1, 50R2 and 50R3 are PUF devices, while semiconductor diode 50L is a normal operating diode. It is noted that the number of diodes formed on epitaxial semiconductor material 16L and epitaxial semiconductor material 16R are not limited to the number shown in FIG. 5. Instead, any number of diodes can be formed on epitaxial semiconductor material 16L, 16R as desired.

In some embodiments and as shown, each semiconductor diode is a lateral diode that contains a first semiconductor material diode portion 52 of a first conductivity type, an optional intrinsic semiconductor material diode portion 54, and a second semiconductor material diode portion 56 of a second conductivity type that is opposite the first conductivity type. In other embodiments (not shown), each semiconductor diode is a vertical stack comprising from, bottom to top, a first semiconductor material diode portion 52 of a first conductivity type, an optional intrinsic semiconductor material diode portion 54, and a second semiconductor material diode portion 56 of a second conductivity type that is opposite the first conductivity type. In some embodiments (also not shown), the lateral diodes can be formed within the epitaxial semiconductor material 16L, 16L itself by ion implantation.

In the embodiment illustrated, each semiconductor diode 50L, 50R1, 50R2 and 50R3 may contain a first semiconductor material diode portion 52 of a first conductivity type, an optional intrinsic semiconductor material diode portion 54, and a second semiconductor material diode portion 56 of a second conductivity type that is opposite the first conductivity type (each material layer may be laterally oriented to each other or vertically oriented to each other) In one example, the first conductivity type may be p-type, and the second conductivity type may be n-type. In another example, the first conductivity type may be n-type, and the second conductivity type may be p-type. The term "intrinsic" denotes a semiconductor material that is non-doped or contains a dopant concentration below 1E17 atoms/cm$^3$. The dopant that provides the first conductivity type and the dopant that provides the second conductivity type may be present in a range from 1E18 atoms/cm$^3$ to 1E21 atoms/cm$^3$.

In some embodiments, a single semiconductor material (doped or undoped) can be epitaxially formed on the epitaxial semiconductor material 16L, 16R. Dopants can be introduced (via ion implantation and/or gas phase doping) as desired into specific regions of the single epitaxial grown semiconductor material to provide an appropriate conductivity type to a specific region. In other embodiments and when a vertical stack is used, a material stack of, from bottom to top, the first semiconductor material diode portion 52, optional intrinsic semiconductor material diode portion 54, and the second semiconductor material diode portion 56 can be formed utilizing various epitaxial deposition processes. In some embodiments, vacuum is maintained between each successive epitaxial deposition process. In yet another embodiment, vacuum may be broken between any of the epitaxial deposition processes.

In some embodiments of the present application, the first semiconductor material diode portion 52, and/or the optional intrinsic semiconductor material diode portion 54, and/or the second semiconductor material diode portion 56 comprise a same semiconductor material as that which provides epitaxial semiconductor material 16L, 16R. In another embodiment of the present application, the first semiconductor material diode portion 52, and/or the optional intrinsic semiconductor material diode portion 54, and/or the second semiconductor material diode portion 56 comprise a different semiconductor material as that which provides epitaxial semiconductor material 16L, 16R.

The terms "epitaxial growth and/or deposition" and "epitaxially formed and/or grown" mean the growth of a semiconductor material on a deposition surface of a semiconductor material, in which the semiconductor material being grown has the same crystalline characteristics as the semiconductor material of the deposition surface. In an epitaxial deposition process, the chemical reactants provided by the source gases are controlled and the system parameters are set so that the depositing atoms arrive at the deposition surface of a semiconductor material with sufficient energy to move around on the surface and orient themselves to the crystal arrangement of the atoms of the deposition surface. Therefore, an epitaxial semiconductor material that is formed by an epitaxial deposition process has the same crystalline characteristics as the deposition surface on which it is formed. For example, an epitaxial semiconductor material deposited on a {100} crystal surface will take on a {100} orientation. In some embodiments, epitaxial growth and/or deposition processes are selective to forming on a semiconductor surface, and do not deposit material on dielectric surfaces, such as silicon dioxide or silicon nitride surfaces.

Examples of various epitaxial growth process apparatuses that are suitable for use in forming epitaxial semiconductor material include, e.g., rapid thermal chemical vapor deposition (RTCVD), low-energy plasma deposition (LEPD), ultra-high vacuum chemical vapor deposition (UHVCVD), atmospheric pressure chemical vapor deposition (APCVD) and molecular beam epitaxy (MBE) or metal-organic CVD (MOCVD). The temperature for epitaxial deposition process typically ranges from 250° C. to 900° C. Although higher temperature typically results in faster deposition, the faster deposition may result in crystal defects and film cracking.

A number of different source gases, which are well known to those skilled in the art, may be used for the deposition of the first semiconductor material diode portion 52, the optional intrinsic semiconductor material diode portion 54, and the second semiconductor material diode portion 56. Carrier gases like hydrogen, nitrogen, helium and argon can be used. In some embodiments, an n-type dopant or a p-type dopant can be present with the source gas that provides the first semiconductor material diode portion 52, and/or the second semiconductor material diode portion 56. In yet another embodiment, the n-type dopant or p-type dopant can be introduced after epitaxial deposition of the first semiconductor material diode portion 52, and/or the second semiconductor material diode portion 56 utilizing ion implantation or gas phase doping. In some embodiments, a patterning process such as lithography and etching, may follow the epitaxial deposition of blanket semiconductor material layers that provide the first semiconductor material diode portion 52, the optional intrinsic semiconductor material diode portion 54, and the second semiconductor material diode portion 56.

In addition to planar FETs as shown in FIG. 4 and semiconductor diodes as shown in FIG. 5, other types of semiconductor devices including, for example, semiconductor finFETs, or semiconductor nanowires can be formed within the area of the structure including the epitaxial semiconductor material 16L and the epitaxial semiconductor material 16R. In some embodiments, it is possible to form different semiconductor devices within the area of the structure including the epitaxial semiconductor material 16L and the epitaxial semiconductor material 16R.

While the present application has been particularly shown and described with respect to various embodiments thereof, it will be understood by those skilled in the art that the foregoing and other changes in forms and details may be made without departing from the spirit and scope of the present application. It is therefore intended that the present application not be limited to the exact forms and details described and illustrated, but fall within the scope of the appended claims.

What is claimed as new is:

1. A semiconductor structure comprising:
   a material stack of, from bottom to top, a semiconductor substrate and a dielectric material, wherein a first trench having a first aspect ratio and a second trench having a second aspect ratio that is greater than the first aspect ratio are present extending entirely through said dielectric material and partially through said semiconductor substrate;
   an epitaxial semiconductor material having a different lattice constant than an upper semiconductor material portion of said semiconductor substrate is present in said first trench and said second trench, wherein said epitaxial semiconductor material present in said first trench has a lower semiconductor material portion that contains defects and an upper semiconductor material portion that is defect free, and said epitaxial semiconductor material present in said second trench contains defects that randomly propagate to a topmost surface of said epitaxial semiconductor material; and
   at least one semiconductor device located on said epitaxial semiconductor material formed in said first and second trenches, wherein said at least one semiconductor device located on said epitaxial semiconductor material present in said second trench is a physical unclonable function device.

2. The semiconductor structure of claim 1, wherein said epitaxial semiconductor material formed in said first trench and said second trench each has a topmost surface that is coplanar with a topmost surface of said dielectric material.

3. The semiconductor structure of claim 1, wherein a width of said first trench is narrower than a width of said second trench, and said first trench and said second trench have a same height.

4. The semiconductor structure of claim 1, wherein said upper semiconductor material portion of said semiconductor substrate is comprised of silicon, and said epitaxial semiconductor material present in said first trench and said second trench comprises germanium, an III-V compound semiconductor or an II-V compound semiconductor.

5. The semiconductor structure of claim 1, wherein said first and second trenches within said upper semiconductor material portion of said semiconductor substrate have tapered sidewalls.

6. The semiconductor structure of claim 1, wherein said at least one semiconductor device comprises a field effect transistor including a gate dielectric material portion and a gate conductor material portion.

7. The semiconductor structure of claim 1, wherein said at least one semiconductor device comprises a semiconductor diode.

8. The semiconductor structure of claim 7, wherein said semiconductor diode comprises a first semiconductor material diode portion of a first conductivity type, and a second semiconductor material diode portion of a second conductivity type, said second conductivity type is opposite said first conductivity type.

9. The semiconductor structure of claim 1, wherein said at least one semiconductor device located on said epitaxial semiconductor material in said second trench comprises a defect-free semiconductor device and a defect-containing device.

10. The semiconductor structure of claim 1, wherein said first aspect ratio is from 1:50 to 1:1.2 and said second aspect ratio is from 10:1 to 1:1.

* * * * *